United States Patent

[11] 3,596,182

| [72] | Inventor | Ronald R. Menard<br>Whiteboro, N.Y. |
|---|---|---|
| [21] | Appl. No. | 824,892 |
| [22] | Filed | May 15, 1969 |
| [45] | Patented | July 27, 1971 |
| [73] | Assignee | The United States of America as represented by the Secretary of the Air Force |

[54] MULTIPATH DELAY AND CORRELATION BANDWIDTH ANALYZER
5 Claims, 4 Drawing Figs.

[52] U.S. Cl. ............................................. 325/67,
250/199, 350/161, 325/181
[51] Int. Cl. ............................................. H04b 1/00
[50] Field of Search ............................................. 250/199;
350/161; 325/67; 356/6, 76, 77, 79, 98; 235/181;
324/77; 340/149; 343/100.7

[56] References Cited
UNITED STATES PATENTS

| 2,941,202 | 6/1960 | Harris et al. | 235/181 |
| 3,158,830 | 11/1964 | Clay | 235/181 |
| 3,111,666 | 11/1963 | Wilmotte | 250/199 |
| 3,483,549 | 12/1969 | Gutleber et al. | 235/181 |

*Primary Examiner*—Robert L. Griffin
*Assistant Examiner*—Albert J. Mayer
*Attorneys*—Harry A. Herbert, Jr. and Julian L. Siegel ABSTRACT: Multipath delay is analyzed by generating and transmitting a pseudorandom signal and at the receiver the reverse replica of the transmitted signal is also generated. The two signals are correlated in an optical correlator where they are passed through ultrasonic modulators while collimated light passes through them and the output is read out on an oscilloscope.

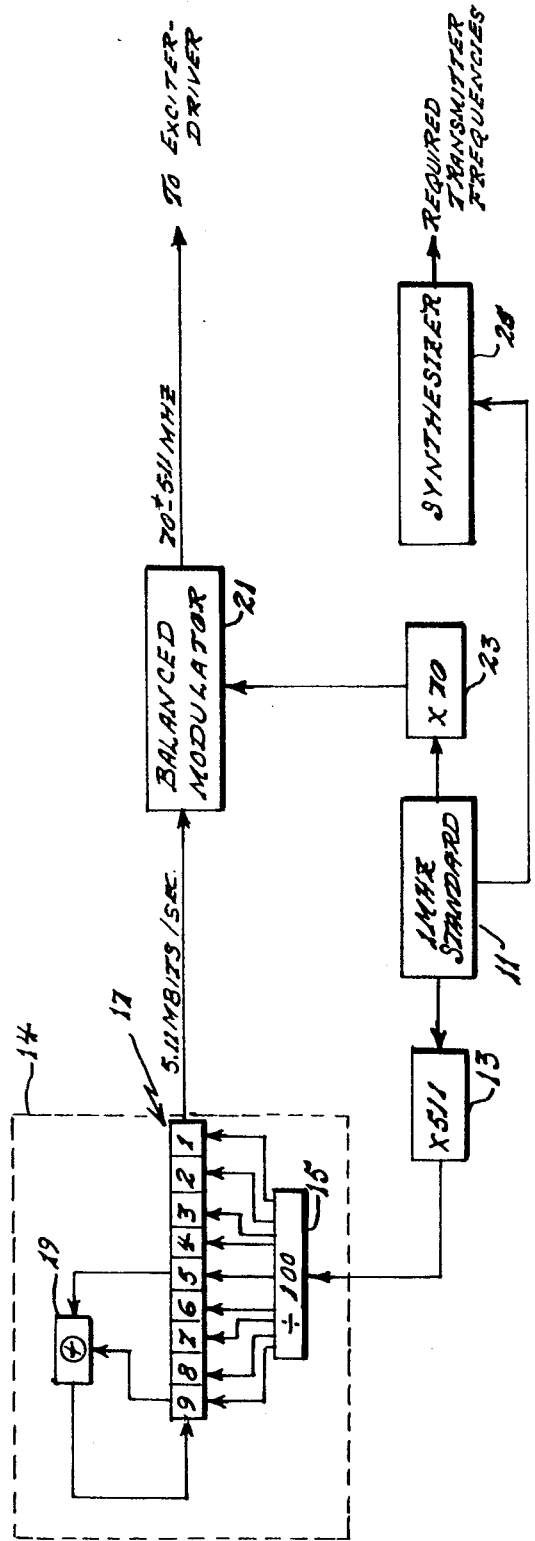
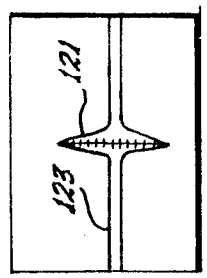
FIG. 1
FIG. 4
INVENTOR.
RONALD R. MENARD

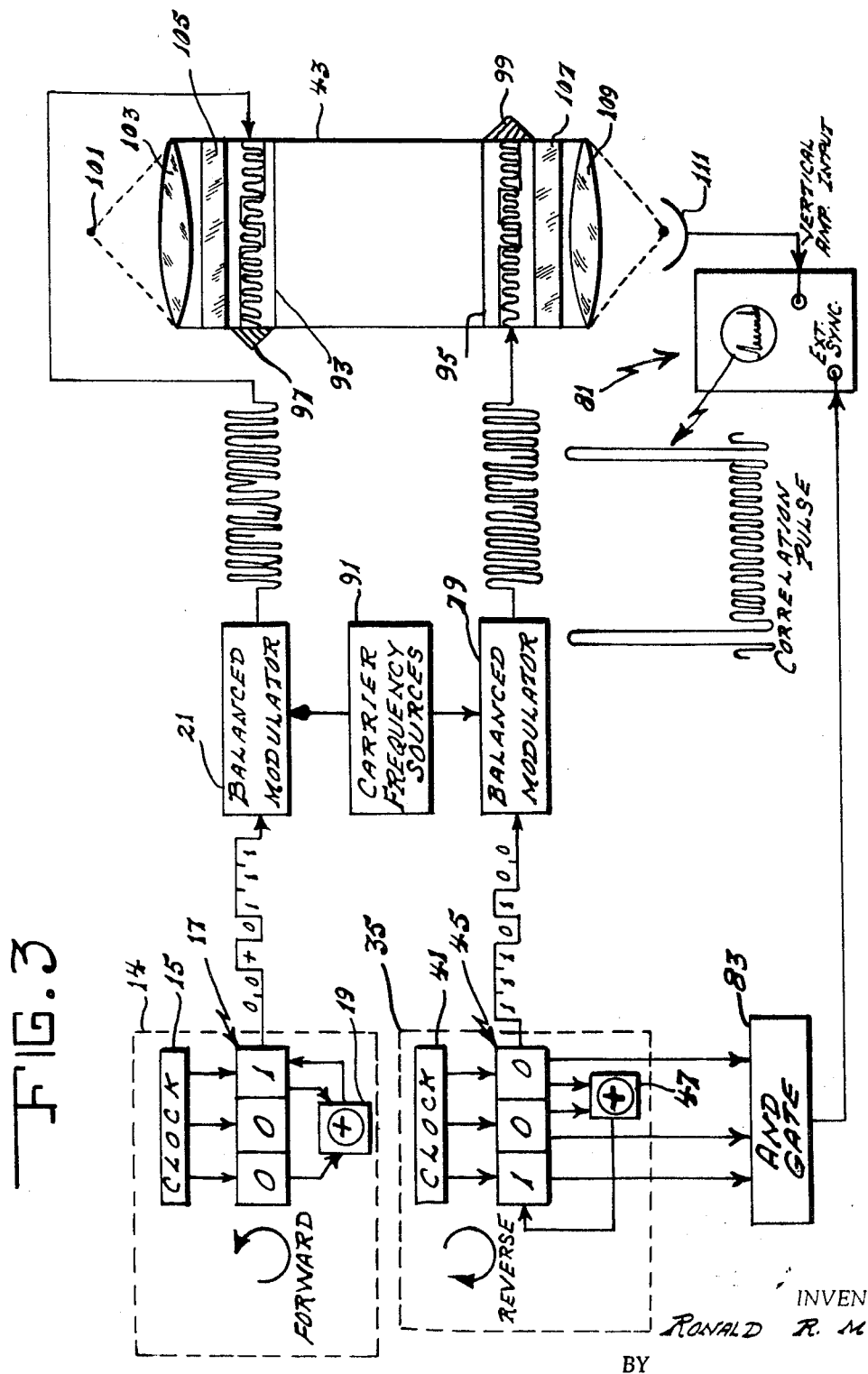

MULTIPATH DELAY AND CORRELATION BANDWIDTH ANALYZER

BACKGROUND OF THE INVENTION

This invention relates to analyses of propagation medium, and more particularly to the measurement of multipath delay and correlation bandwidth.

The analyzer measures the multipath delay and correlation bandwidth of the propagation medium which is particularly important at present high data rates communications systems and especially important at the higher data rates proposed in the future where the main source of error is expected to result from intersymbol interference and frequency selective fading.

The analyzer enables an operator to completely specify the statistics of any Hf, VHF, UHF and SHF time variant channel to a resolution of less than 0.2 $\mu$sec. while simultaneously recording selective fading and digital error rates. The experimental data can be obtained simultaneously with other channel users and the results compared with theoretically derived relationships. Through the utilization of electro-optics, the multipath delay measurement is made in real time over a continuum of 100 microseconds volume. The instantaneous readout capability of the Multipath Delay and Correlation Bandwidth Analyzer is not only of value statistically but provides an ideal control signal for adaptable communications techniques.

This invention is a unique application of the optical correlator for determining the ray structure of signals propagated over a dispersive path, and it is possible to determine the arrival times of pulses signals received over different paths and thus obtain data from which to analyze the propagation.

In the past there has been no satisfactory technique for obtaining this data. However, this invention makes possible the collection of propagation information unobtainable previously and offers a better understanding of the tropophericscatter propagation mode and leads to better design of tropospheric-scatter communications equipment.

With the present invention the multipath delay and correlation bandwidth of a tropospherics catter channel can be measured, in real time, using an optical correlator for the first time. This provides the capability of measuring medium statistics simultaneous with system performance. The experimental data can now be used to compare the actual dependence of error rate on multipath delay, with the theoretical relationships.

SUMMARY OF THE INVENTION

Compression is accomplished by optically correlating the received signal with a locally generated receiver signal identical to the code used for expansion in the transmitter. When the received signal is aligned with the receiver signal a correlation pulse is developed at the output of the correlator. If the received signal is a sum of time displaced signals caused by multipath, the output of the correlator will be a series of correlation pulses deplaced in time. The height of a correlation pulse is a measure of the energy arriving at the time of the pulse.

Selective fading is measured by displaying the received signal prior to correlation on a spectrum analyzer. The display shows an amplitude versus frequency response of the medium.

The optical correlator, which enables the multiple delay and correlation bandwidth to be measured in real time, uses fused silica delay lines mounted between cross-polarizers and illuminated with collimated light. The received signal and the reference signal, driving separate delay lines, propagate in opposite directions, so that one signal scans the other. The signal indicating correlation, a large variation in output light intensity, is detected by a photomultiplier.

It is therefore an object to provide a system for analyzing the propagation medium.

It is another object to provide a multipath and correlation bandwidth analyzer.

It is still another object to provide a multipath and correlation bandwidth analyzer.

It is still another object to provide a multipath and correlation bandwidth analyzer that measures frequency selective fading.

It is still another object to provide a multipath and correlation bandwidth analyzer that produces a digital error rate of signals transmitted through a medium.

These and other advantages, features and objects of the invention will become more apparent from the following description taken in connection with the illustrative embodiment of the accompanying drawings, wherein:

DESCRIPTION OF THE DRAWINGS

FIG. 1 is a block diagram showing the modulator that derives the coded probe signal;

FIG. 3 shows the system of the multipath analysis using the optical correlator; and FIG. 4 is an oscilloscope graph showing the noise ratio of the correlation function of the probe signal.

DESCRIPTION OF THE PREFERRED EMBODIMENT

Figure 2:
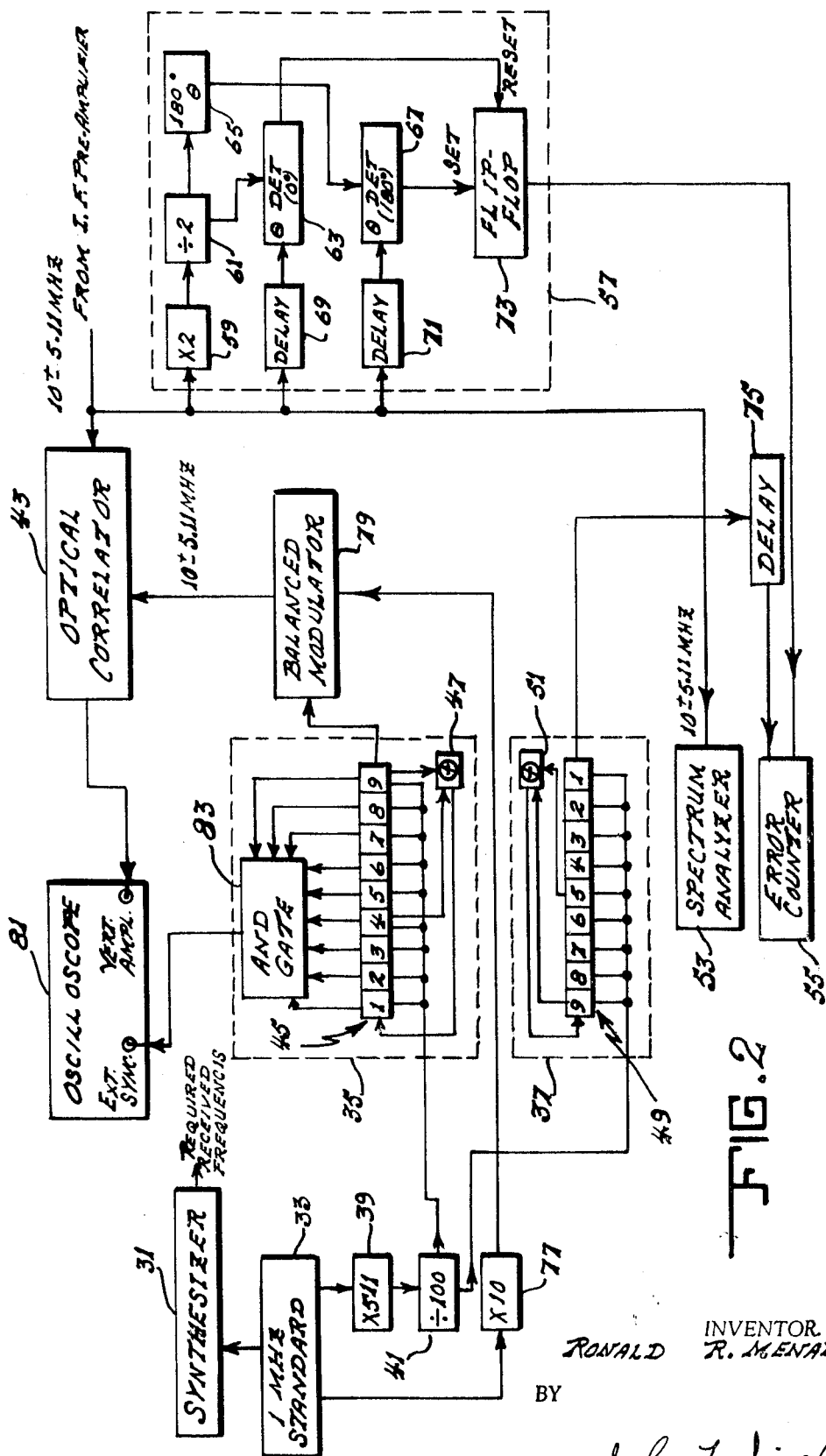
FIG. 2 is a block diagram of the demodulator and the display portion of the analyzer together with the selective fading and the error rate analyzer.

The operation and structure incorporates the well-known theorem of communication theory which states that the optimum filter for detection of a signal immersed in white Gaussian noise is one whose transfer function is the complex conjugate of the signal spectrum. In addition, if the signal is composed of a superposition of time-displaced signals of similar form, the matched filter is used for resolving the signal components and measuring their individual amplitudes.

If the signal is written as $s(t)$ and its Fourier spectrum as $S(\omega)$, the filter which is matched to the signal has a transfer function $s(\omega)$ (where the * denotes complex conjugate), and performs the operation $$S_o(\omega) = s(\omega) S(\omega)$$

on the signal spectrum, where $S_o(\omega)$ is the spectrum of the filtered signal. The output of the matched filter is the Fourier transform of $S_o(\omega)$, $$s_o(t) = F[S(\omega) S(\omega)].$$

Using a well-known property of Fourier transforms, this can be written as $$s_o(t) = \int s(t-\tau) s(-\tau) d\tau$$

this is seen to be a cross-correlation of the signal with a replica of itself. It the signal is a summation of overlapping, time displaced signals, the equation becomes $$s_o(t) = \int a_i s(t-t_i-\tau) s(-\tau) d\tau$$

where $a_i$ is the amplitude of the $i$'th component, and $t_i$ is its time displacement. If the signal has a sharp autocorrelation function, without large secondary maxima, then the $i$'th signal component has significant amplitude only in the vicinity of $t=t_i$. Thus, at $t=t_i$, the output signal is due essentially only to the $i$'th component and is thus a measure of $a_i$. The output signal $s_o(t)$, as a function of time, is therefore a measure of each $a_i$ in sequence.

The following describes the system for measuring the multipath delay, correlation bandwidth and the digital error rate of HF, VHF, UHF, and SHF transmission mediums. A probe signal is transmitted, at the receiver the incoming signal is correlated optically with a locally generated replica (a stored reference). The probe signal has a $sin^2 X/X^2$ lined power spectrum and is derived by biphase modulating an RF carrier with a linear pseudorandom sequence. The clock frequency of the pseudorandom sequence generator determines the transmission bandwidth and the length of the code determines the density of the lined power spectrum (number of lines in the transmission bandwidth).

A pseudorandom sequence is used to derive the probe signal because of its autocorrelation function properties. The probe signal's normalized time autocorrelation function is 1 when $\tau=0$ and 0 when $\tau=\pm 1$/clock frequency. The correlation function of the received and the receiver signal is obtained, in real time, using an optical correlator. The output of the optical correlator, when displayed on an oscilloscope, is a triangle with a base of 1/clock frequency and a peak-to-R.M.S. noise ratio of the time bandwidth product or the processing gain of the correlator. The device can resolve multipath delays of less than 1/clock frequency.

Selective fading on the amplitude versus frequency response of the channel is measured by displaying the received signal on a spectrum analyzer. The probe signal lined power spectrum can have a frequency selective fading measurement resolution of 10 kc. and is independent of the transmission bandwidth.

Since the identical digital code is used in the transmitter to expand and in the receiver to compress the probe signal, the received signal may be detected and compared on a bit by bit basis, to the receiver code, once aligned in time (synchronized). The number of bit disagreements divided by the total number of bits received would be the digital error rate of the transmission medium.

Referring now to FIG. 1, showing the modulator that derives the probe signal, the clock frequency determines the bandwidth of the probe signal which in the example shown is ±5.11 MHz. The 5.11 MHz. that results in a bandwidth of ±5.11 MHz. is derived from 1 MHz. standard 11 and then fed to frequency multiplier 13 followed by frequency divider 15.

The delay lines in the optical correlator (to be explained later) determine the integration time used during compression of the probe signal and also determine the period of the pseudorandom code since one complete code must fill each delay line in the optical correlator to facilitate a perfect cross-correlation function. Since the delay lines in the example are 100 microseconds, a code period must also be 100 microseconds or 511 bits. This is produced by pseudorandom generator 14, comprising a nine-stage shift register 17 with feedback from stages 9 to 5 through modulo-two adder 19. The probe signal is developed in balanced modulator 21 by biphase modulating a 70 MHz. sine wave with the 511-bit code in balance modulator 21 for transmission. The 70 MHz. signal is biphased modulated so that there is a phase shift of either 0° or 180° and these shifts are equivalent to a logical "0" or "1". 70 MHz. is chosen for the center frequency of the probe signal because it is a common transmitter modulation frequency and is obtained from multiplier 23 fed by frequency standard 11. Any frequencies required by the transmitter that the analyzer modulates are derived from frequency standard 11 in synthesizer 25.

Referring to FIG. 2, the demodulator and the receiver used to translate the received RF signals to a 10 MHz. IF input signal for the analyzer require frequencies derived at synthesizer 31 from a 1 MHz. stable source 33. Pseudorandom generators 35 and 37 are pulsed by a clock rate of 5.11 M bits per second derived from frequency standard 33 through multiplier 39 and divider 41. Pseudorandom generator 35 produces the time inverse of the transmitted or received 511 code which is required by optical correlator 43 to produce the multipath measurements. The reverse code is developed by nine-stage shift register 45 with feedback from stages 9 and 4 through modulo-two adder 47. Forward pseudorandom generator 37 is required by the error counting circuit and is identical to the transmitter pseudorandom generator. The code is developed by a nine-stage shift register 49 with feedback from stages 9 and 5 through modulo-two adder 51. The use of a modulo-two adder causes the pseudorandom generation because the feedback input varies pseudorandomly, hence if the inputs to the modulo-two adder are the same the feedback inputs would be a "0" and if the inputs are different a "1" would result.

When the analyzer is used for measuring selective fading the received signal, converted to an intermediate frequency, is fed to spectrum analyzer 53 (such as Hewlett and Packard 851/8551) which presents an amplitude versus frequency display of the received signal.

The digital error rate is obtained by comparing in error counter 55 the locally generated pseudorandom signal with the identical signal that is received and results in a printout of accumulated error. The received signal which has been biphased modulated is reshaped into a square wave by reshaping circuit 57. Modulation is removed from the received signal by multiplier 59 and divider 61 operating to produce reverse ratios of the input signal thereby preserving the same frequency which is then fed as a reference standard to 0° phase detector 63 and also via 180° phase shifter 65 to 180° phase detector 67. The received signal is also fed to phase detectors 63 and 67 through delays 69 and 71. The output of the phase detectors control the set and reset terminals of flip-flop 73 which produce a square wave for feeding to error counter 55. The locally generated replica of the received signal is also fed to error counter 55 via delay 75.

For analysis of the multipath delay, the output of frequency standard 33 is fed to multiplier 77 and then fed to balance modulator 79 where it is modulated by the pseudorandom signal from generator 35. The modulated signal is fed to optical correlator 43 for correlation with the received signals. The correlation output is displayed on oscilloscope 81 by feeding the correlation signal to the vertical amplifier of the oscilloscope. The external synchronization of oscilloscope 81 is triggered by AND gate 83 which is fed by the nine stages of shift register 45.

Referring to FIG. 3, the operation of the multipath analyzer is shown where the sequences of pulses are shortened to seven for simplicity and the shift registers have been shortened to three stages. Pseudorandom generators 14 and 35 comprise linear shift registers which produce a code and its replica. The code biphase modulates carrier frequency derived from sources 91 in modulators 21 and 79. The carrier frequency is the center frequency of ultrasonic light modulators 93 and 95 of optical correlator 43 which produces a video signal for driving the ultrasonic modulators. The ultrasonic modulators are two-fused silica delay lines mounted between cross-polarizers 105 and 107 and illuminated with collimated light. The received signals and the reference signal driving separate delay lines propagate in opposite directions so that one signal scans the other. Two ultrasonic light modulators 93 and 95 terminated by absorbers 97 and 99 convert the video signals into traveling acoustical waves that modulate the collimated light passing through them. The collimated light originates from light point source 101 and passes through lens 103 followed by polarizer 105. The collimated light passes through second polarizer 107 and is impressed on lens 109 and results in a point by point multiplication of the two codes scanning each other in the ultrasonic light modulators. Lens 109 integrates this product by focusing the light on photomultiplier tube 111. The output of photomultiplier tube 111 is a correlation function of the two codes which is displayed on oscilloscope 81. AND gate 83 of generator 35 produces an output each time all of the binary 1's of the code occur and this signal is used to externally synchronize oscilloscope 81. By using the delayed sweep capability of oscilloscope 81, the correlation function with the multipath can be positioned in the center of the cathode-ray tube and magnified which allows the analyzer to measure the time of arrival of the signal in reference to the medium path as well as the spread of the time difference before and after the medium path. The data can be recorded by observing with a high speed instrumentation camera synchronized to the horizontal sweep of the oscilloscope or for the selective fading measurements to the spectrum analyzer.

I claim:
1. A multipath delay analyzer comprising;
  a. a transmitter frequency source;
  b. transmitter means for generating a pseudorandom code fed by the transmitter frequency source;
  c. a transmitter balanced modulator fed by the frequency source and the output of the transmitting pseudorandom code generating means;
  d. means for transmitting the modulated signal;
  e. a receiver frequency source;

f. a first receiver means fed by the receiver frequency source for generating a random code inverse to that generated by the transmitter generating means;

g. a receiver balanced modulator fed by the receiver frequency source and the first receiver generating means; and h. means for optically correlating the outputs of the receiver modulator and the transmitted signal from transmitter means.

2. A multipath delay analyzer according to claim 1 wherein the optical correlator comprises:

a. means for producing collimated light;

b. a first ultrasonic light modulator positioned for the passage of collimated light fed by the output of the receiver balanced modulator;

c. a second light modulator fed by the transmitter balanced modulator, in parallel alignment with the first light modulator with respect to the modulator signal, and fed in the reverse direction to the first ultrasonic light modulator; and d. a photomultiplier adjacent to the second light modulator and positioned for the reception of light passing therethrough, the output of the photomultiplier representing the correlation function.

3. A multipath delay analyzer according to claim 1 which further comprises:

a. a second receiver means fed by the receiver frequency source for generating a second pseudorandom code identical to that generated by the transmitter generating means;

b. an error counter fed by the second receiver generating means and the transmitted signal from the transmitting means; and c. reshaping means interposed between the error counter and the transmitting means.

4. A multipath delay analyzer according to claim 2 which further comprise a pair of polarizers, one each in parallel juxtaposition to the outer surfaces of each light modulator.

5. A multipath delay analyzer according to claim 4 wherein the light modulators comprise fused silica delay lines.